United States Patent
Mimeault et al.

(10) Patent No.: US 8,159,660 B2
(45) Date of Patent: Apr. 17, 2012

(54) OPTICAL LEVEL MEASUREMENT DEVICE AND METHOD

(75) Inventors: Yvan Mimeault, Québec (CA); Louis Perreault, Québec (CA)

(73) Assignee: Leddartech Inc., Québec, Quebec (CA)

( * ) Notice: Subject to any disclaimer, the term of this patent is extended or adjusted under 35 U.S.C. 154(b) by 75 days.

(21) Appl. No.: 12/935,631

(22) PCT Filed: Apr. 3, 2009

(86) PCT No.: PCT/CA2009/000428
§ 371 (c)(1),
(2), (4) Date: Sep. 30, 2010

(87) PCT Pub. No.: WO2009/121181
PCT Pub. Date: Oct. 8, 2009

(65) Prior Publication Data
US 2011/0026015 A1    Feb. 3, 2011

Related U.S. Application Data

(60) Provisional application No. 61/042,424, filed on Apr. 4, 2008.

(51) Int. Cl.
*G01B 11/26* (2006.01)
(52) U.S. Cl. ............ 356/139.1; 356/5.01; 356/5.1; 356/139.01
(58) Field of Classification Search ........ 356/3.01–3.15, 356/4.01–4.1, 5.01–5.15, 6–22, 28, 28.5, 356/139.01–139.1
See application file for complete search history.

(56) References Cited

U.S. PATENT DOCUMENTS

| | | | |
|---|---|---|---|
| 4,928,232 A | 5/1990 | Gentile |
| 4,938,590 A | 7/1990 | Ishida |
| 5,102,218 A | 4/1992 | Min et al. |
| 5,179,286 A | 1/1993 | Akasu |
| 5,194,747 A | 3/1993 | Culpepper et al. |
| 5,257,090 A | 10/1993 | Meinzer et al. |
| 5,291,031 A | 3/1994 | MacDonald et al. |
| 5,357,331 A | 10/1994 | Flockencier |
| 5,621,518 A | 4/1997 | Beller |
| 5,648,844 A | 7/1997 | Clark |
| 5,760,887 A | 6/1998 | Fink et al. |
| 5,805,468 A | 9/1998 | Blohbaum |
| 6,044,336 A | 3/2000 | Marmarelis et al. |
| 6,094,159 A | 7/2000 | Osterfeld et al. |
| 6,100,539 A | 8/2000 | Blumcke et al. |
| 6,115,113 A | 9/2000 | Flockencier |
| 6,259,515 B1 | 7/2001 | Benz et al. |

(Continued)

FOREIGN PATENT DOCUMENTS

CA    2063661    4/1993
(Continued)

*Primary Examiner* — Thomas Tarcza
*Assistant Examiner* — Luke Ratcliffe
(74) *Attorney, Agent, or Firm* — Fasken Martineau

(57) ABSTRACT

A method and system for determining a level of a substance in a container, the method comprises emitting one pulse from a light source in a field of illumination toward a surface of said substance in said container. A backscatter signal of said pulse is detected by an optical detector. A lidar trace is created from said backscatter signal, said lidar trace including at least one reflection peak; A surface reflection is identified among said at least one reflection peak in said lidar trace, said surface reflection being a reflection of said pulse from said surface. The surface reflection is signal-fitted to provide a fitted surface trace. A level of said substance is determined in said container using said fitted surface trace.

21 Claims, 12 Drawing Sheets

U.S. PATENT DOCUMENTS

| | | |
|---|---|---|
| 6,339,468 B1 | 1/2002 | Clifford et al. |
| 6,407,803 B1 | 6/2002 | Schrank |
| 6,516,286 B1 | 2/2003 | Aebischer et al. |
| 6,581,461 B1 | 6/2003 | Diaz |
| 6,665,621 B2 | 12/2003 | Drinkard et al. |
| 6,753,950 B2 | 6/2004 | Morcom |
| 6,831,576 B2 | 12/2004 | Geiger et al. |
| 6,836,317 B1 | 12/2004 | Perger |
| 6,842,231 B2 | 1/2005 | Nourrcier et al. |
| 7,082,828 B1 | 8/2006 | Wilkins |
| 7,635,854 B1 * | 12/2009 | Babin .......................... 250/573 |
| 2007/0255525 A1 | 11/2007 | Lee et al. |

FOREIGN PATENT DOCUMENTS

| | | |
|---|---|---|
| CA | 2330626 | 11/1999 |
| CA | 2619095 | 8/2008 |
| WO | 2008024910 | 2/2008 |

* cited by examiner

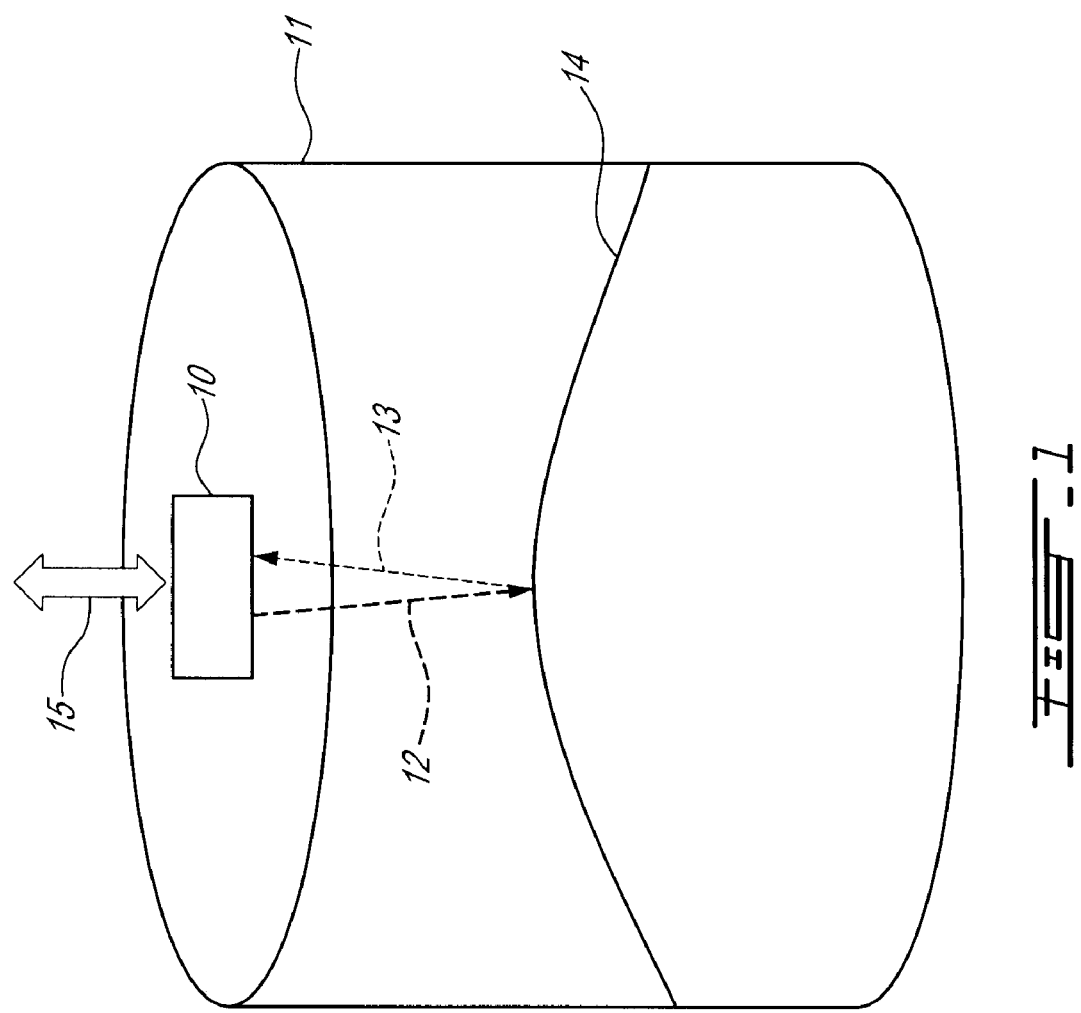

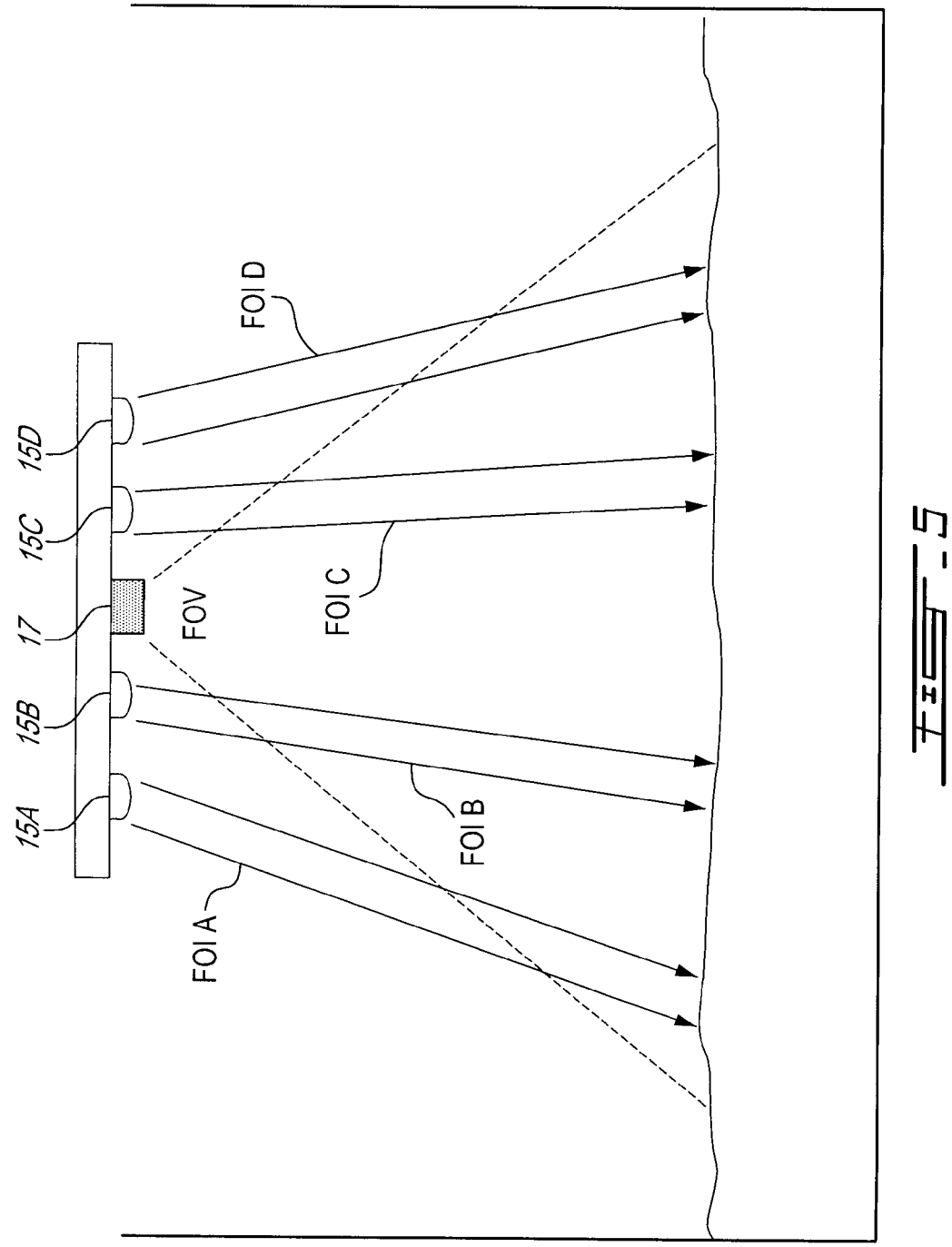

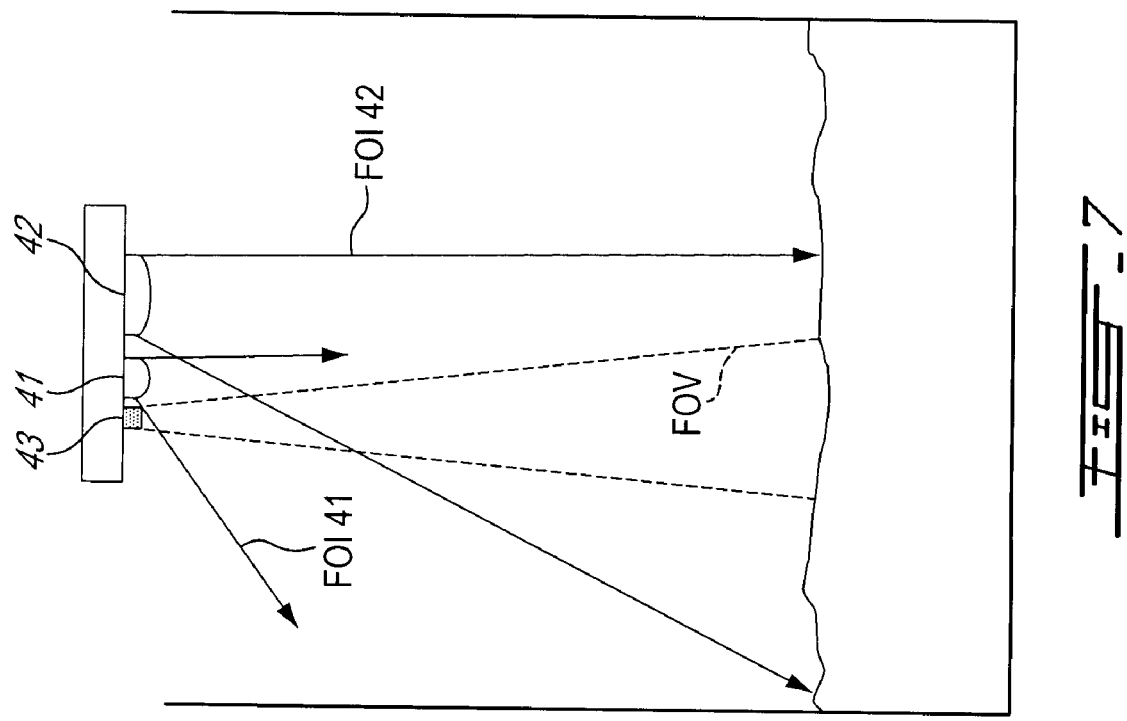

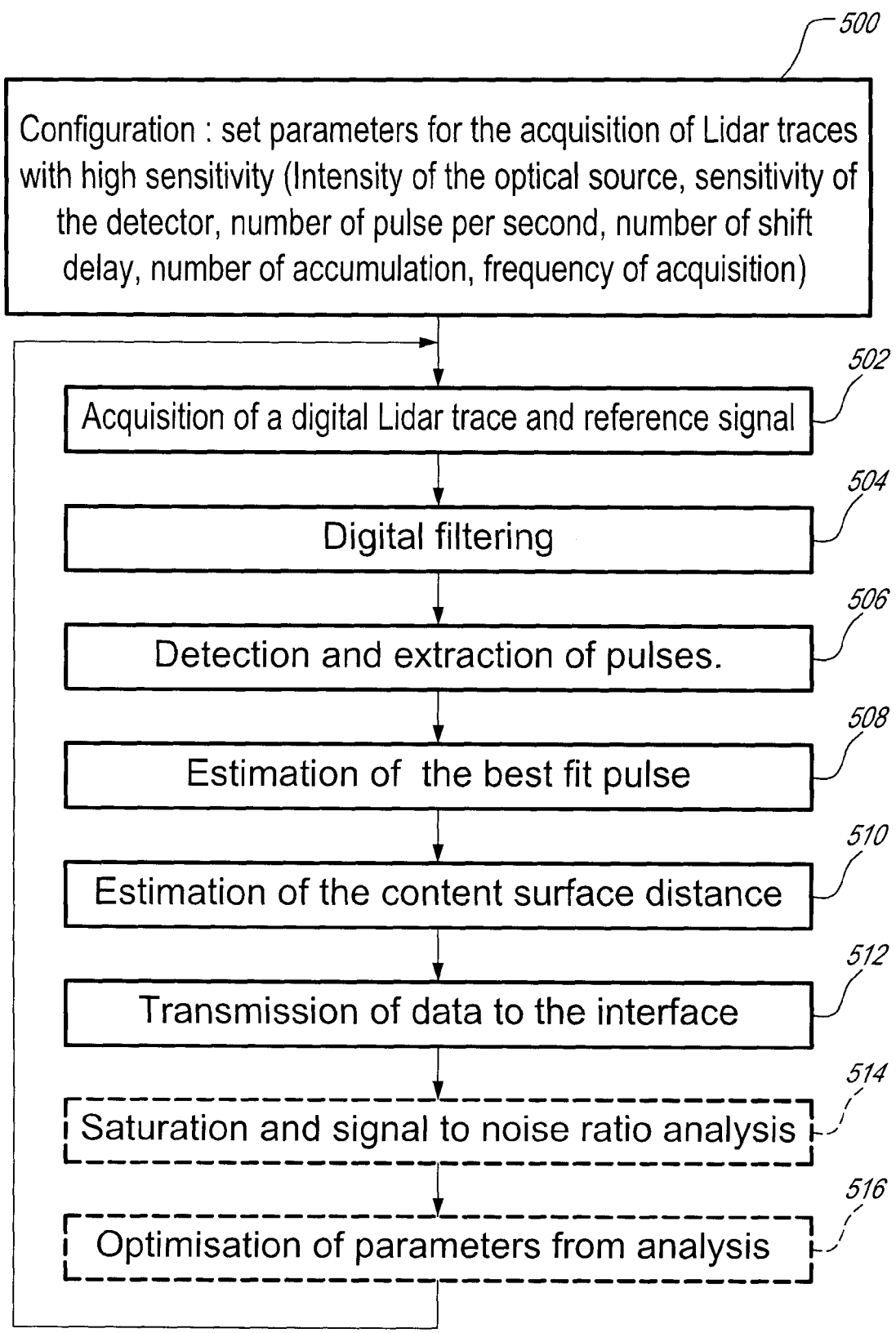

OPTICAL LEVEL MEASUREMENT DEVICE AND METHOD

CROSS-REFERENCE TO RELATED APPLICATIONS

This application claims priority under 35 U.S.C. §371 from PCT Application No. PCT/CA2009/000428, entitled "Optical Level Measurement Device and Method", filed on Apr. 3, 2009; which in turn claims priority of U.S. provisional patent application No. 61/042,424 filed on Apr. 4, 2008 by Applicant.

TECHNICAL FIELD

This present invention relates to level sensing and more particularly to optical non-contact measurement of the fill-level in a container.

BACKGROUND OF THE ART

Several industrial applications involve the need to measure the level in a container or a tank, filled with substances such as liquid or bulk material. There are several techniques for determining the fill level which can be split in two main categories depending on whether the sensing element is in contact with the substance or not. Non-intrusive and non-contact techniques have several advantages, notably in terms of contamination and maintenance. Radar and ultrasonic technologies are generally involved in non-contact level measurement. However, radar technology has some limitations when used with low dielectric material and is sensitive to false echoes. Ultrasonic technology shows lower performance when pressure and temperature fluctuate.

Optical level measurement is another non-contact technique. This technique uses a light beam which is directed to the top surface of the liquid or material and reflected back to an optical sensor. For liquid level measurement, a floatable reflector is generally used to improve the performance. Some optical methods use the speed of light to determine the distance between the sensor and the surface. One of such methods is based on the time of flight principle using short pulses of light generated by a laser.

Optical systems based on the time of flight principle are well suited for fill-level sensing applications where the range of the detection is relatively short (typically <100 m) and the refresh rate is relatively low. However resolution and accuracy should be relatively high. In order to provide such accuracy, such optical level systems usually use costly lasers with very short pulses (few ns or less).

SUMMARY

It is therefore an aim of the present invention to address at least one of the above mentioned difficulties.

There is provided a novel optical fill-level sensing device using a light beam source.

There is also provided a method for continuous measurement of the level in a container or a tank, filled with liquid, dry or paste material.

There is also provided a fill-level sensing device and method that improves the signal to noise ratio of the detection, increase the measurement accuracy and therefore relaxes the requirements for the light source in terms of performance.

According to one broad aspect of the present invention, there is provided a method for determining a level of a substance in a container, the method comprising: emitting one pulse from a light source in a field of illumination toward a surface of said substance in said container; detecting a backscatter signal of said pulse by an optical detector; creating a lidar trace from said backscatter signal, said lidar trace including at least one reflection peak; identifying a surface reflection among said at least one reflection peak in said lidar trace, said surface reflection being a reflection of said pulse from said surface; signal-fitting said surface reflection to provide a fitted surface trace; and determining a level of said substance in said container using said fitted surface trace.

Further in accordance with the broad aspect, said identifying said surface reflection comprises signal-fitting each of said at least one reflection peak and determining a best matched reflection peak to be said surface reflection.

Still further in accordance with the broad aspect, said identifying said surface reflection comprises identifying a last one of said at least one reflection peak to be said surface reflection.

Still further in accordance with the broad aspect, said substance is a transparent liquid and wherein said identifying said surface reflection comprises eliminating a container bottom reflection from said at least one reflection peak using a known shape for a reflection from a bottom of said container.

Still further in accordance with the broad aspect, the method further comprises detecting a reference backscatter signal of said pulse by a reference optical detector at said emission of said pulse thereby acquiring a reference zero value and a reference trace for said pulse; comparing said reference trace for said pulse to said combined trace; and determining a distance traveled by said pulse based on said comparison.

Still further in accordance with the broad aspect, said emitting comprises emitting with said light source being a light-emitting diode (LED).

Still further in accordance with the broad aspect, the method further comprises providing a timer; triggering said timer to calculate a time elapsed between said emission of said pulse and said detection of said backscatter signal; determining a distance traveled by said pulse based on said time elapsed.

Still further in accordance with the broad aspect, said emitting comprises emitting with several light sources being driven sequentially.

Still further in accordance with the broad aspect, said signal-fitting comprises curve-fitting a non-symmetrical quasi-Gaussian function on said trace.

Still further in accordance with the broad aspect, said curve-fitting uses the point corresponding to the peak of the curve as the reference position, wherein the curve is quasi-Gaussian in that the exponent is not 2, the equation being:

$$f(x) = y = A * e^{-\frac{|x-\mu|^n}{v}},$$

where y is the sampled trace as a function of x which corresponds to the sampling time and n is a predetermined value that is different depending on whether (x−μ) is positive or negative.

Still further in accordance with the broad aspect, finding the values of the parameters A, μ and v, comprises plugging the combined trace in the equation f(x) and a minimization algorithm is used with the following equations:

$$\frac{df}{dA} = e^{-\frac{|x-\mu|^n}{v}} = 0$$

-continued $$\frac{df}{d\mu} = s*A*e^{-\frac{|x-\mu|^n}{v}} *n* \frac{|x-\mu|^{n-1}}{v} = 0$$

$$\frac{df}{dv} = \frac{|x-\mu|^n *A*e^{-\frac{|x-\mu|^n}{v}}}{v^2} = 0$$

Still further in accordance with the broad aspect, finding the value comprises using the following starting point: A=the highest value of y, μ=the x position of the highest value and v=5.8.

Still further in accordance with the broad aspect, said detecting further comprises using at least one other optical detector for detecting at least one other backscatter signal of said pulse; and multiplexing said backscatter signal with said at least one other backscatter signal.

Still further in accordance with the broad aspect, the method further comprises emitting at least one other pulse from at least one other light source, each of said light source and at least one other light source having at least partly different fields of view, said detecting a backscatter signal of said pulse by said optical detector comprising detecting at least one other backscatter signal respectively of said at least one other pulse by said optical detector and multiplexing said backscatter signal with said at least one other backscatter signal.

Still further in accordance with the broad aspect, the method further comprises emitting at least one other pulse from at least one other light source, each of said light source and at least one other light source having at least partly different fields of view, said detecting a backscatter signal of said pulse by said optical detector comprising detecting at least one other backscatter signal respectively of said at least one other pulse by said optical detector and multiplexing said backscatter signal with said at least one other backscatter signal.

Still further in accordance with the broad aspect, said determining the level comprises determining the level of one of a liquid, a paste and a solid.

Still further in accordance with the broad aspect, said emitting comprises emitting with one light source is a low power LED used for short range measurements and further comprising a second light source, said second light source being used for at least medium range measurements, further comprising providing a range indication for said measurement and controlling said one light source and said second light source to emit said pulse depending on said range indication.

Still further in accordance with the broad aspect, said emitting with the second light source comprises using one of a high power LED and a laser.

Still further in accordance with the broad aspect, said emitting comprises emitting for the short range measurements with the short range being a range of less than 3 meters.

Still further in accordance with the broad aspect, the method further comprises controlling said light source by a pulse driver to modify an output power of said light source.

Still further in accordance with the broad aspect, the method further comprises providing a detection parameter and wherein said controlling uses said detection parameter.

Still further in accordance with the broad aspect, said providing said detection parameter comprises providing a reflectivity parameter, said reflectivity parameter being indicative of a reflectivity of at least one of said substance and walls of said container.

Still further in accordance with the broad aspect, said providing said detection parameter comprises providing a range parameter, said range parameter being indicative of a level of said substance in said container.

Still further in accordance with the broad aspect, said providing said detection parameter comprises providing a clarity parameter, said clarity parameter being indicative of a dust density inside the container.

According to a second broad aspect of the present invention, there is provided a fill-level sensing device for determining a level of a substance in a container comprising: a light source for emitting light in a field of illumination toward a surface of said substance in said container; a pulse driver for driving the light source into emitting one pulse; an optical detector adapted to detect a backscatter signal of said pulse; and a data/signal processor for creating a lidar trace from said backscatter signal, said lidar trace including at least one reflection peak, for identifying a surface reflection among said at least one reflection peak in said lidar trace, said surface reflection being a reflection of said pulse from said surface; for signal-fitting said surface reflection to provide a fitted surface trace; and for determining a level of said substance in said container using said fitted surface trace.

Further in accordance with the second broad aspect, the light source is a light-emitting diode (LED).

Still further in accordance with the second broad aspect, the fill-level sensing device further comprises a timer, the timer being triggered by the data/signal processor to calculate a time elapsed between said emission of said pulse and said detection of said backscatter signal, the data/signal processor determining a distance traveled by said pulse based on said time elapsed.

Still further in accordance with the second broad aspect, the fill-level sensing device further comprises several of said light source being driven sequentially.

Still further in accordance with the second broad aspect, the fill-level sensing device further comprises at least one other optical detector for detecting at least one other backscatter signal of said pulse, the data/signal processor multiplexing said backscatter signal with said at least one other backscatter signal.

Still further in accordance with the second broad aspect, the light source is a low power LED used for short range measurements and further comprising a second light source, said second light source being used for at least medium range measurements, and further wherein the data/signal processor provides a range indication for said measurement and said pulse driver controls said one light source and said second light source to emit said pulse depending on said range indication.

Still further in accordance with the second broad aspect, the second light source comprises using one of a high power LED and a laser.

Still further in accordance with the second broad aspect, the pulse driver modifies an output power of said light source.

Still further in accordance with the second broad aspect, the fill-level sensing device further comprises an analog-to-digital converter for sampling the backscatter signal of said pulse, and a pre-processing and synchronisation unit for controlling parameters of said pulse from the analog-to-digital converter.

Still further in accordance with the second broad aspect, the parameters are at least one of the optical power of the light pulse, the number of pulses used for pre-process operation, a gain of amplifier, a synchronization between the pulse driver and the analog-to-digital converter, and a sample rate of analog-to-digital converter.

Still further in accordance with the second broad aspect, the fill-level sensing device further comprises at least one other light source emitting at least one other pulse, each of said light sources having at least partly different fields of view, said optical detector detecting a backscatter signal of said pulse comprises detecting at least one other backscatter signal respectively of said at least one other pulse by said optical detector and said data/signal processor multiplexing said backscatter signal with said at least one other backscatter signal.

Still further in accordance with the second broad aspect, the fill-level sensing device further comprises a reference optical detector for detecting a reference backscatter signal of said pulse at said emission of said pulse thereby acquiring a reference zero value and a reference trace for said pulse, and wherein data/signal processor compares said reference trace for said pulse to said combined trace, and determines a distance traveled by said pulse based on said comparison.

BRIEF DESCRIPTION OF THE DRAWINGS

Having thus generally described the nature of the invention, reference will now be made to the accompanying drawings, showing by way of illustration a preferred embodiment thereof and in which:

FIG. 1 is a schematic view of a container equipped with a fill-level sensing device;

FIG. 5 is a schematic view of a system configuration with multiple optical sources and one optical detector;

FIG. 7 is a schematic view of a system configuration with no dead zone

FIG. 12 is a flowchart illustrating a process for determining a level of a substance in a container.

It will be noted that throughout the appended drawings, like features are identified by like reference numerals.

DETAILED DESCRIPTION

Figure 4:
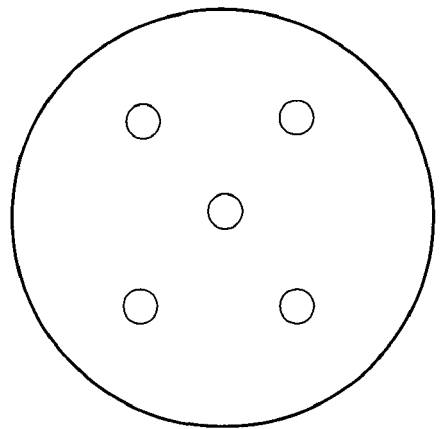
FIG. 4 is a top plan schematic view of the material inside the container illustrating the reflection of multiple fields of view on the material.

FIG. 1 shows an example embodiment of a container 11 equipped with a fill-level sensing device 10. The fill-level sensing device 10 is used for measuring the level of a liquid, material or particles, herein the material 14, in the container 11. At least one light source (not shown) emits light pulses 12 directed to the bottom of the container 11. At least one optical detector (not shown) corresponding to one field of view is used to receive the echo back signal 13 reflected on the top surface of the material 14 and the fill-level sensing device 10 measures the level in the container 11. Information of the fill-level is transmitted by the interface 15 to an external controller (not shown).

Figure 3:
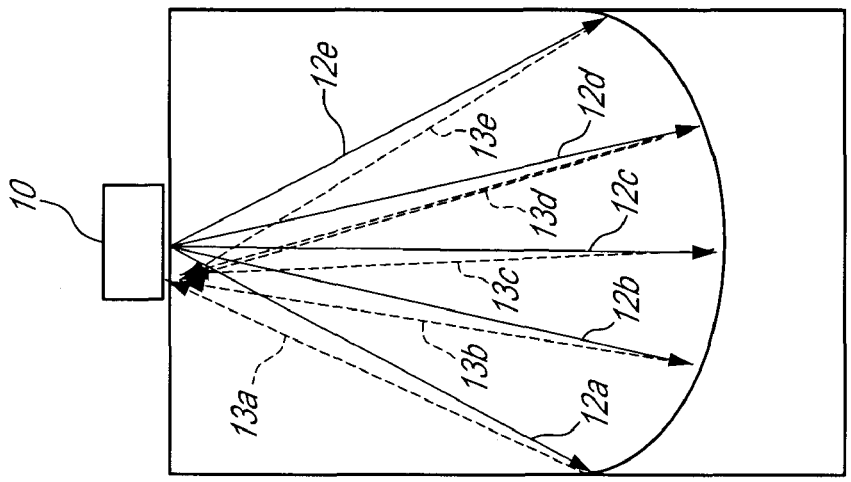
FIG. 3 is a vertical cross-section view of a container illustrating the use of multiple fields of views in a container that is being emptied of dry material.
Figure 2:
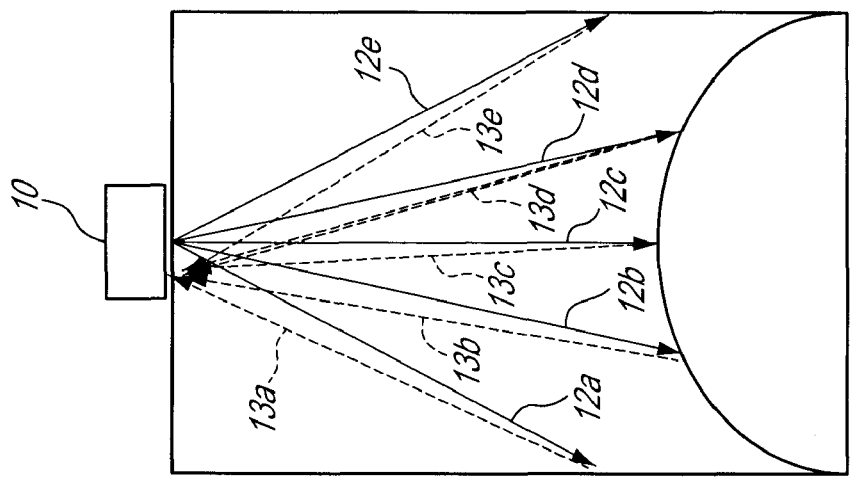
FIG. 2 is a vertical cross-section view of a container illustrating the use of multiple fields of views in a container that is being filled with dry material.

FIG. 2 and FIG. 3 illustrate a device 10 using multiple fields of view, five in this case, i.e. 12a-13a, 12b-13b, 12c-13c, 12d-13d, 12e-13e, in order to enhance a fill measurement in the case of container 11 containing dry material. FIG. 4 illustrates the multiple fields of view 12a-13a, 12b-13b, 12c-13c, 12d-13d, 12e-13e as seen from the top of the material 14 in the container 11.

Various configurations of light sources and optical detectors can be used to provide the multiple fields of view. In one embodiment using a plurality of detectors, each corresponding to one field of view, each detector can be multiplexed and used with the same acquisition circuit. FIG. 5 shows another embodiment in which a system configuration involves a plurality of discrete optical sources 15A to 15D, each emitting in a respective fixed field of illumination FOIA to FOID within a volume space covered by the field of view of detector 17. Optical pulses from each optical source 15 may be driven sequentially by a source controller (not shown) and the signal reflected back for those illuminated regions in the container are received by detector 17.

An alternative embodiment involves a plurality of discrete detectors or an array of detectors, each detector observing a respective fixed field of view within a volume space illuminated by at least one optical source. Another alternative embodiment can use at least one optical source and at least one optical detector having a narrow field of view in combination with a scanning mechanism changing the portion of the illuminated and detected section of the container. Time of flight depth sensors or tree-dimensional imaging sensors can also be used as detectors in the device 10. FIG. 2 illustrates the use of the device 10 when the container 11 is being filled with dry material, i.e. the top surface of the material 14 is convex, while in FIG. 3 the container 11 is being emptied of dry material, i.e. the top surface of the material 14 is concave. The use of multiple fields of view allows for the device 10 to take multiple measurements on the top surface of the material 14, thus improving the fill-level measurement in the case of a curved top surface compared to a device having a single field of view.

Figure 6:
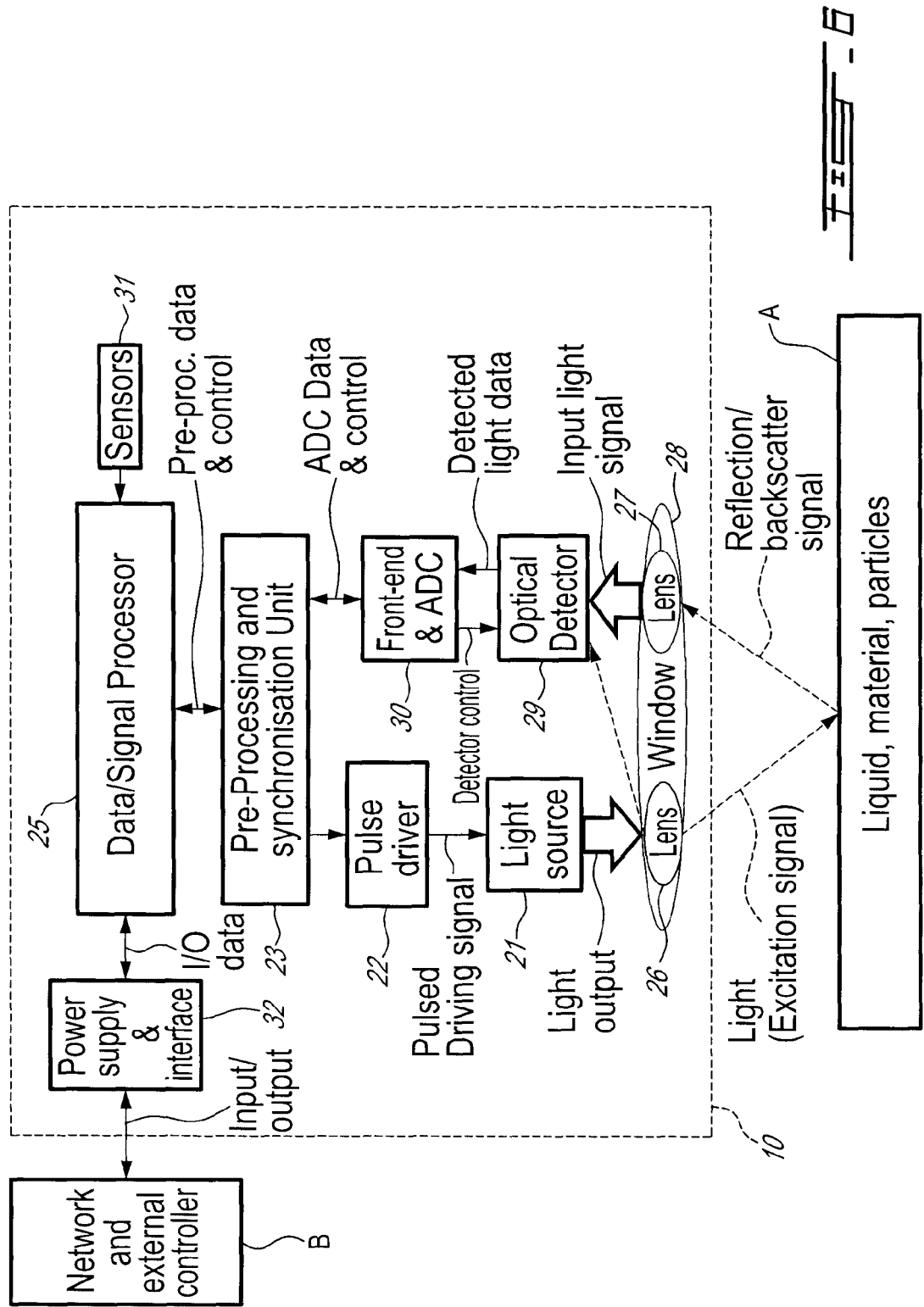
FIG. 6 is a block diagram of the fill-level sensing device of FIG. 1.

FIG. 6 shows a block diagram of the fill-level sensing device 10. The device 10 has a light source 21. The light source 21 has one or more solid-state lighting devices, LEDs or lasers for instance (visible or non-visible). Several types of light sources can be used to add the capability for detecting several types of particles by selecting specific wavelengths. A specific wavelength can also be selected to minimize the attenuation of particles. White phosphorescent LEDs can be used as a source generating a broad spectrum of wavelengths and can be used for color measurements or spectroscopic measurements. Visible light sources can also be useful during the installation as a pointer and distance meter reference. The light source can also be used to determine the condition of the lens.

The light source 21 is connected to a pulse driver 22, so as to be driven into producing short pulses. When a LED is used as a light source 21, the amplitude of pulses emitted by the LED can be several times its nominal value, with a low duty cycle narrow pulse (typically less than 50 ns).

Sequencing of the drive signals is controlled by the pre-processing and synchronisation unit 23. The light source 21 can be monitored by the optical detector 29 and the resulting parameters sent to the data/signal processor 25 for optimization of) the data processing.

The device 10 has at least one output lens 26 through which light is emitted to illuminate in the container 11. At least one input lens 27 is used for receiving the light signal reflected back or diffused (i.e., backscattered) by the surface of liquid, material or particles 14 in the container 11. This input lens 27 can be at a single location or distributed (multiple zone elements). Various types of lenses can be used, such as fresnel lenses for instance. A sub-section of the lens can be used for infrared wavelengths. Input and output lenses can be integrated in a single optical element. A window 28 can be used to transmit and receive light and protect the device 10 from the environment of the container 11. Window cleaning can be performed by pulsated air-jets. Continuous flow removes any accumulation of dust.

An optical detector 29 is associated with the light source 21 and the lenses 26 and 27. The detector 29 is an optical detector (or detectors) adapted to collect light emitted by the light source 21 and reflected or back-scattered by the surface of material 14 or particles inside the container 11. The optical detector 29 is, for example, a photodiode, an avalanche photodiode (APD), a photomultiplier (PMT), a CMOS or CCD array sensor, or a 3D camera sensor (time-of-flight depth sensor).

Filters are typically provided with the detector 29 to control ambient light background emitted from others sources of light, enhancing the performance of the light source 21. Filters can also be used for spectroscopic measurements.

A color sensor or a camera can also be used in combination with a white LED to acquire image and color information from the container 11.

A front-end and Analog-to-Digital Converter (ADC) 30 is connected to detector 29 and receives detected light signal therefrom. It samples the detected light signal with an ADC sample rate of F MHz (one sample every 1/F µs). It also controls the detector 29. For instance, the Vbias of an avalanche photodiode detector of the detector 29 can be adjusted using the front-end and ADC 30 in order to optimize the gain of the receiver section for an Automatic Gain Control (AGC).

A pre-processing and synchronisation unit 23 is connected to the pulse driver 22 and to the front-end and ADC 30 for controlling parameters such as the optical power of the light pulses, the number of pulses used for pre-process operation, gain of amplifier, synchronization between pulse driver 22 and ADC, and sample rate of the ADC at F MHz (one sample every 1/F µs).

Figure 8A:
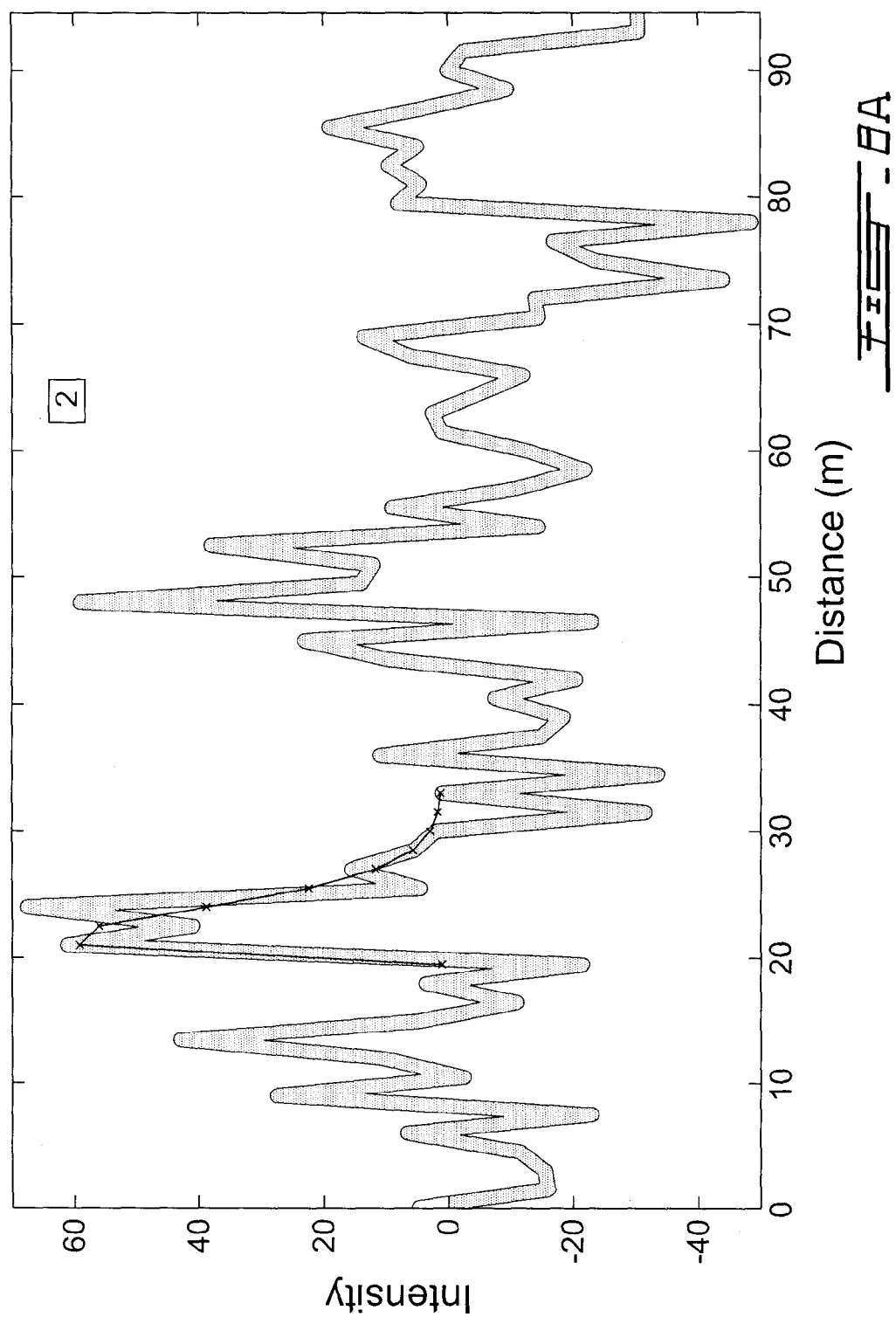
FIG. 8a is a graph showing a trace, shown in gray, acquired using an accumulation of two light pulses, along with a curve fit performed on the trace, shown in black.
Figure 8B:
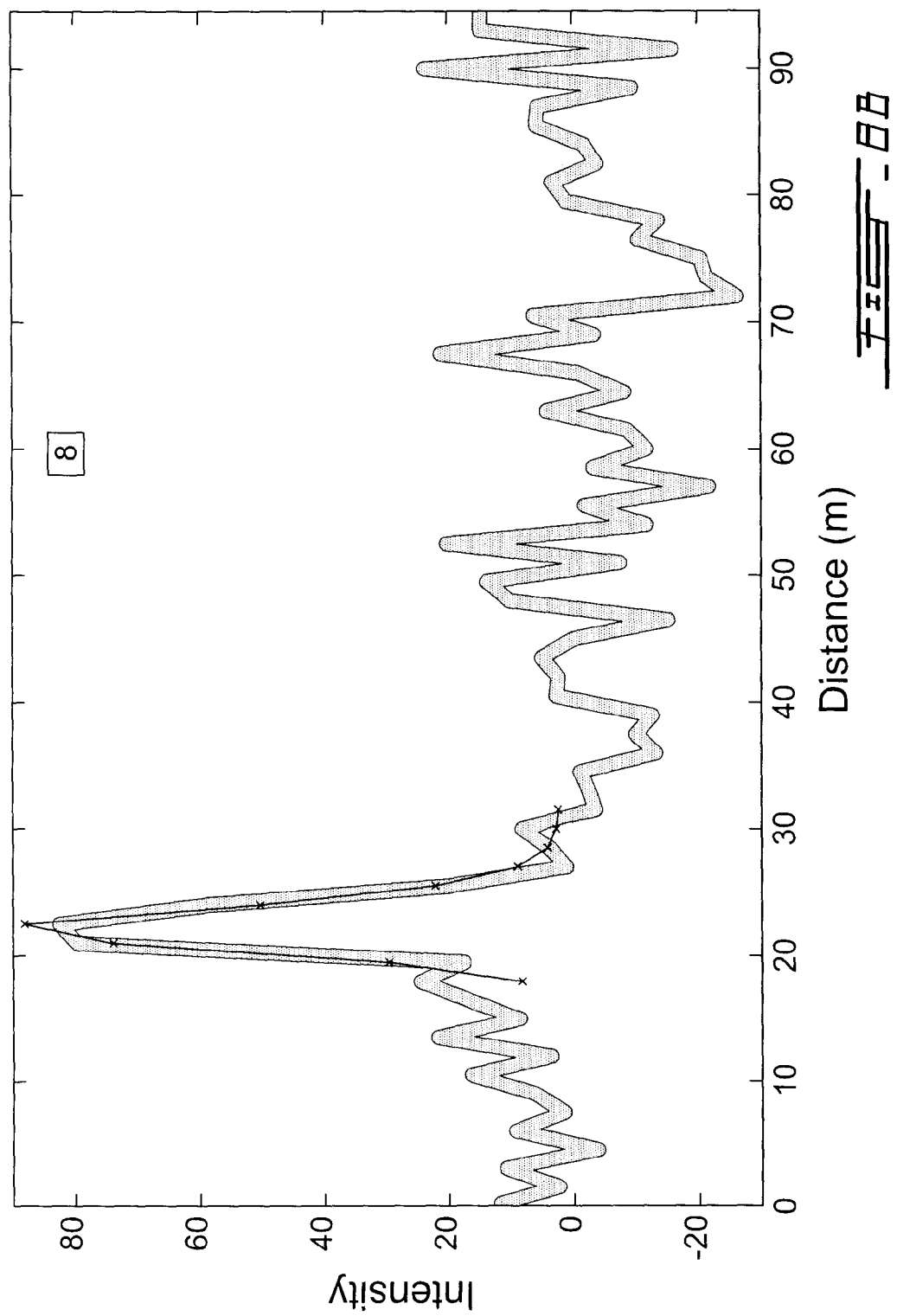
FIG. 8b is a graph showing a trace, shown in gray, acquired using an accumulation of eight light pulses, along with a curve fit performed on the trace, shown in black.
Figure 8C:
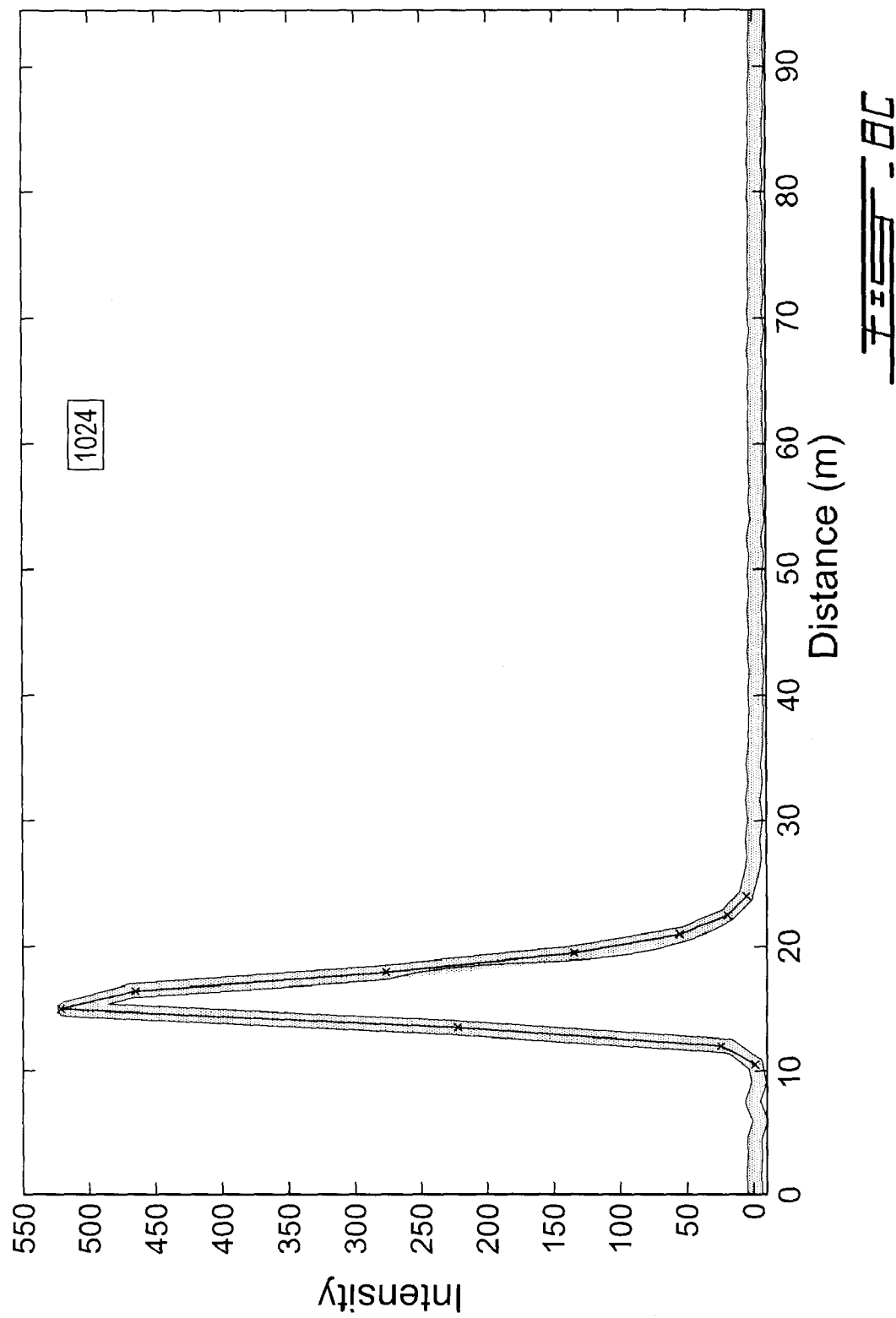
FIG. 8c is a graph showing a trace, shown in gray, acquired using an accumulation of 1024 light pulses, along with a curve fit performed on the trace, shown in black.

The device 10 uses an accumulation technique combined to a phase shift technique in order to obtain accurate fill-level measurements. Preferably, low cost light sources having low power and speed performances such as LEDs are used. However, lasers can also be used. The accumulation technique improves the signal to noise ratio of the detected light signal using multiple measurements, similar to an averaging. In order to produce one level measurement, the pre-processing and synchronisation unit 23 uses M light pulses and the corresponding M data sets of the optical power as detected at the optical detector 29 and sampled by the ADC 30 with an ADC time resolution of 1/F µs. This accumulation may take up to few hundreds of millisecond but, considering that the level to be measured in the container 11 varies slowly, each one of the M sets will be used to update the level of the container. The M sets are accumulated in a single memory in the pre-processing and synchronisation unit 23 such that the M sets are added point per point. Example results of the accumulation technique are shown on FIGS. 8a, 8b and 8c. FIG. 8a shows a trace obtained with an accumulation of two sets. FIG. 8b shows an improvement in terms of signal to noise ratio by accumulating eight sets. Finally, FIG. 8c shows how an accumulation of 1024 sets can improve the signal to noise ratio. The higher the number M of accumulated sets, the better the signal to noise ratio of the resultant accumulated trace.

Furthermore, the phase shift technique is used to improve the time resolution of the trace acquired by the ADC converter 30 and limited by its sample rate F MHz. The phase shift technique allows for the use of a low cost ADC having a low sample rate F by virtually increasing the effective sample rate. The effective sample rate is) increased by a factor P by acquiring P sets corresponding to P light pulses while shifting the phase between the emitted light pulse and the ADC sampling rate. The phase shifting between each acquisition corresponds to $2\pi/P$. The P sets obtained are then combined in a single trace by interleaving the P sets such that the resulting trace is equivalent to a single measurement with a sampling rate of F×P.

In this embodiment, a first light pulse is emitted toward the top surface of the material 14 and the reflected or back scattered light pulse is detected by the optical detector 29. The detected light signal is then sampled by the ADC converter 30 with a sampling rate F to obtain a first set with a phase of 0. In one example, the sampling rate F is 50 MHz. A phase shift of $2\pi/P$ is then introduced by hardware in the ADC converter 30 such that, when a second light pulse is emitted and detected on the optical detector 29, the sampling performed on the detected light signal is phase shifted by $2\pi/P$. Phase shifting can also be controlled by introducing a phase shift in the light source 21 to shift the emitted light pulse. In one example, P=4 and the phase shift is then $\pi/2$. The second set thereby obtained can be considered as a second measurement of the same light pulse but wherein the sampling is phase shifted relative to the light pulse. All P sets with phase shifts of $J*2\pi/P$, where j corresponds to integers from 0 to P-1, are obtained in the same way. The P sets obtained are then combined in a single trace by interleaving the P sets such that the resulting trace is equivalent to a single measurement with a sampling rate of F×P. In the example given, four sets are obtained with phase shifts of $J*\pi/2$ and the combined single trace has an effective sampling rate of 200 MHz (4×50 MHz).

By combining the accumulation and the phase shift techniques, an accumulation of M sets is performed for each one of the P phase shifts, for a total of N=M×P acquisition sets. Using the N sets, the pre-processing and synchronisation unit 23 creates one combined trace of the reflected light pulse. Each point in the combined trace is an accumulation of M=N/P sets and the effective time resolution of the combined trace is $1/(F \times P)$ µs.

Figure 9:
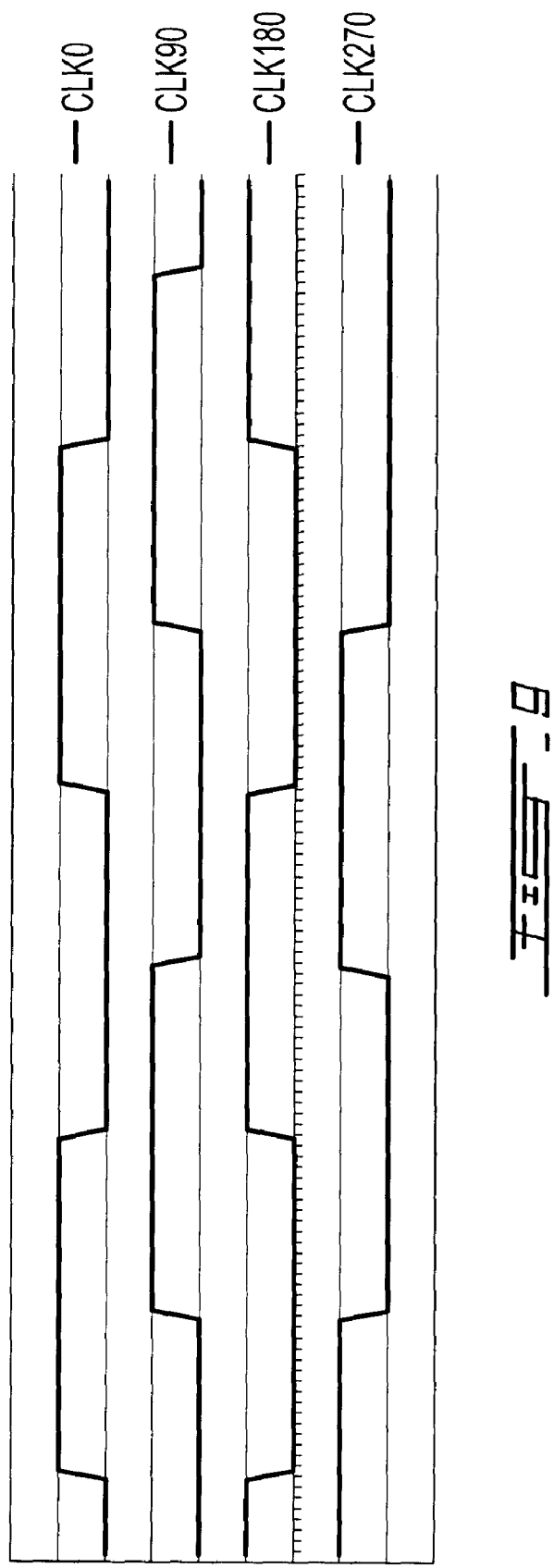
FIG. 9 is a graph illustrating a quadratic phase shift.

Accumulation and shift control can be done by a programmable logic, a Field Programmable Gate Array (FPGA) for instance. Phase shifting can be controlled by introducing a phase shift in the light source 21 to shift the emitted light pulse. Phase shifting can also be controlled by delaying the clock of the ADC converter 30 by a fraction of a period. Half period phase shifts, quadrant phase shifts or even fixed fine phase shifts (up to $1/256^{th}$ of the clock period) can be obtained. FIG. 9 shows a quadrant phase shift diagram used in one embodiment. When using a quadrant phase shift, the pre-processing and synchronisation unit 23 controls the synchronisation between the pulse driver 22 and the acquisition made by the ADC converter 30 in order to generate four phases of acquisition each delayed by one quarter of the acquisition clock period relative to the previous one. This provides an improvement of the temporal resolution by a factor of four. However, the accumulation is decreased by a factor of four when using the same total number N of pulses to generate the combined trace. The length of the buffer used to store the combined trace needs to be at least A×P, where A is the number of samples taken for each light pulse trace and P, the number of phase shifts.

It is noted that the phase shift between the emitted light pulse and the ADC sampling rate can be provided either by introducing a phase shift in the ADC converter 30 to shift the sampling or by introducing a phase shift in the light source 21 to shift the emitted light pulse.

The data/signal processor 25 is connected to the pre-processing and synchronisation unit 23, and receives pre-processed data, i.e. the combined trace. The data/signal processor 25 has a processing unit (e.g. a CPU) so as to interpret the pre-processed data from the pre-processing and synchronisation unit 23 in order to determine the fill-level in the container 11. Accordingly, information about the fill-level of the container is calculated by the data/signal processor 25 as a function of the relation between the driving data and the detected light data based on the time-of-flight principle. In order to compute the fill-level in the container 11 from the combined trace, the position of the light pulse in the trace should be determined (see FIGS. 8b and 8c). For improved accuracy, the position of the light pulse in the combined trace may be determined using a curve fitting as described below.

In view of the calculation it performs, the data/signal processor 25 controls the pulse driver 22 and thus the light source 21 (through the pre-processing and synchronisation unit 23). For instance, the light source 21 may be required to increase or reduce its intensity, or change the parameters of its output. For example, output power of the light source 21 can be adjusted in function of the reflectivity of the material 14 inside the container 11 and also in function of the reflectivity of the container itself (avoiding detector's saturation). The output power can also be controlled in function of the fill-level of the container 11 and conditions such as dust density inside the container 11.

The data/signal processor 25 also performs a calibration process. Signal analysis also allows the discrimination between a signal resulting from a reflection on the walls of the container and from a reflection on the material 14. This discrimination is based on the fluctuation of the shape of the reflected signal, determined using the variance of the detected and sampled light pulse (described in the detection and signal fitting technique below).

The device 10 also has sensors 31 connected to the data/signal processor 25. The sensors 31 comprise an inclinometer or a temperature sensor for example. The sensors 31 are useful during the installation and during operation of the device 10. For instance, data from an inclinometer are useful to correct for an inclination of the field of view relative to the vertical. Temperature sensors are useful for temperature compensation of the fill-level measurement or to provide information about the temperature inside the container (remote temperature with FIR lens).

The device 10 has a power supply and interface 32. The interface section is connected to the data/signal processor 25 and transmits the fill-level measurement and other types of measurement (temperature, etc.) to an external controller B using any communication connection such as, for example, 4-20 mA, Hart, Fieldbus, wireless, power line, Ethernet or CAN bus. The external controller B may also program, calibrate and control the fill-level device 10.

Adjustable or multiple lighting sources can be used to eliminate dead zones. In one embodiment showed in FIG. 7, a low power LED 41 is used as an optical source for the short range measurements (ex.: <3 m) and a high power LED or laser 42 for medium or long range measurements (ex.: >3 m), in combination. The field of illumination of the low power LED 41 covers the first meters in the close field of view of detector 43, while the field of illumination of the high power LED or laser 42 covers the rest of the range of the field of view of the detector 43, down to the bottom of the container.

Figure 10:
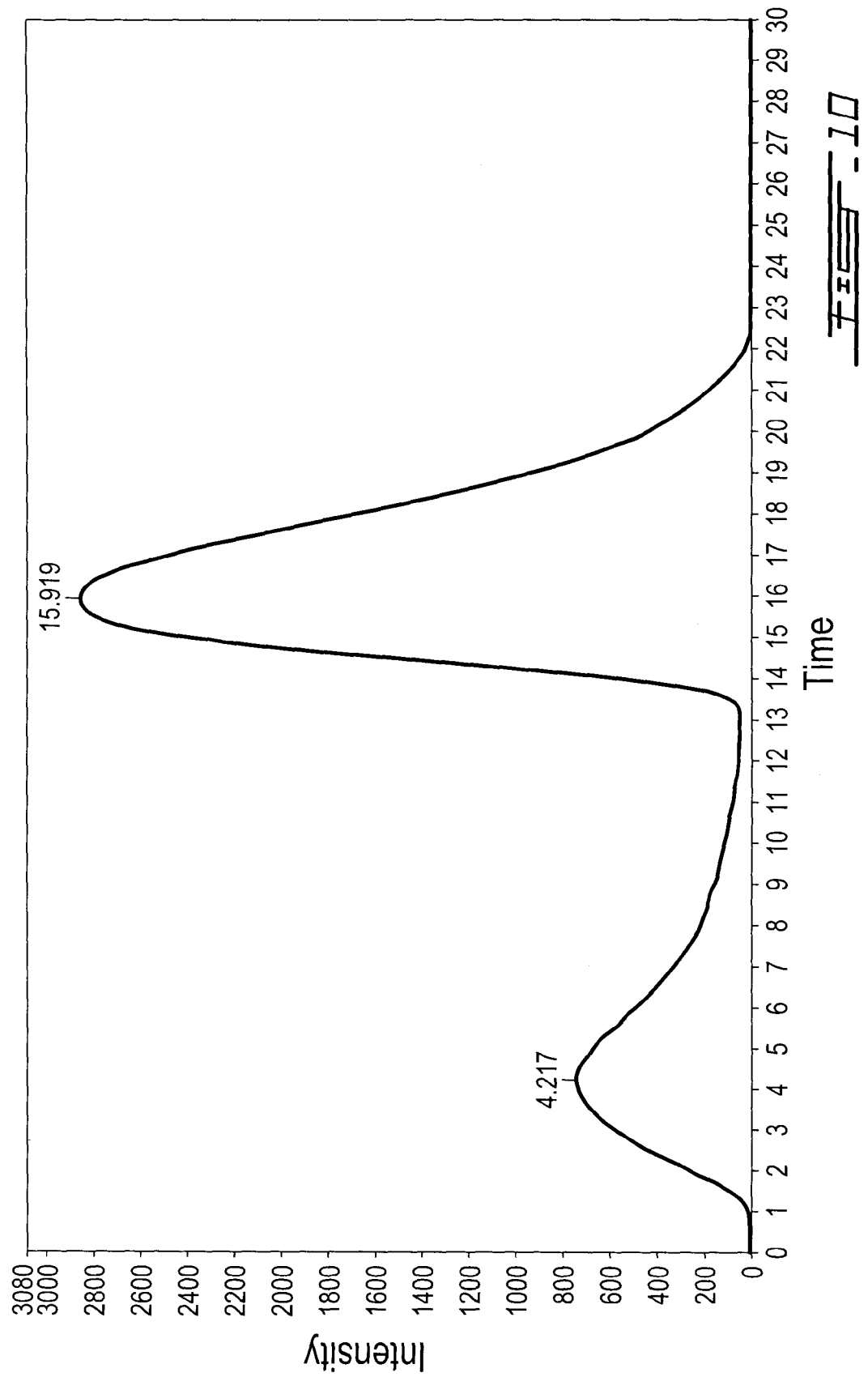
FIG. 10 is a graph showing a typical echo back signal from a container with a mask of vapor.

A detection and signal fitting technique for distance computation with light sources is now described. The acquisition of the lidar trace permits the analysis of all the backscatter signal from the container. If the container is polluted by dust or vapor, a parasitic echo will be detected and because those particles are generally light reflective in a known manner, it will be eliminated. FIG. 10 shows a typical echo back signal from a container with a mask of vapor detected at a few meters from the sensor and a surface measured at 15.9 meters. In that example, a typical optical rangefinder would have triggered on the first pulse due to the backscatter of vapor. But this first pulse has a shape slightly different compared to a solid object, such as the surface in the container.

Depending on the context, different methods can be used to make sure that the proper echo is used for distance computation. The first approach is to assume that nothing can be seen behind the surface to be measured and use the last echo detected. If the polluting substance is not localized but uniformly spread in the container, then the echo will tend to be stretched on the descent side (as can be seen in the FIG. 10). The shape of the pulse can then be used to reject backscattered signals that do not have the shape of a "normal" target.

In both approaches, the fact that the processing unit has access to the complete signal is a big advantage compared to typical optical rangefinder devices.

In the case of the multiple fields of view (see FIG. 2), the analysis of the shape of the pulse can also help to detect the wall of the container. When the angle between the optical emission and the wall is small, the reflected back signal from the wall will be stretched compared to the typical reflection from the surface.

We have developed different methods for increasing the resolution of distance computation. All involve finding the peak of the pulse at a resolution higher than the sampling rate of the trace (in other words, not just using the highest point on the pulse).

In theory if there was no noise and the pulse was symmetric, we could simply use the highest point and its two neighbors to perform a local parabolic fit. If we approximate these three points as a parabola than the position of the peak is:

$$x_p = x_2 + \Delta x \left( \frac{y_2 - y_1}{2y_2 - y_1 - y_3} - 0.5 \right)$$

Where:

$x_p$ is the position of the peak, $\Delta x$ is the sampling step, $x_n$ is the distance of point n and $y_n$ is the intensity value of point n.

The points are chosen so that index 2 is the highest point, index 1 is its predecessor and index 3 is its successor. The needed sampling rate on the trace would just need to be high enough so that we have at least three points on the pulse. In practice this does not work very well because there is noise. The three points need to be as close as possible to the peak requiring a higher resolution and also the pulse is not symmetric and is not a parabola so using this method would give a non-linear non-monotonic relationship between the computed distance and the real distance.

The first way of working around these problems is to fit a mathematical model on the points and use the peak of this model as the distance.

The fast rise and drop of the pulse naturally lend to an exponential curve fit. It is however noted that, depending of the electronic driver, the light pulse signal emitted by a LED light source (or Laser) is non-symmetrical: the rise is sharper than the drop. The herein technique uses a curve fit to a non-symmetrical quasi-Gaussian curve and uses the point corresponding to the peak of the curve as the reference position. The curve is quasi-Gaussian in that the exponent is not 2. This gives an accuracy that is at least an order of magnitude better than the sampling resolution. The equation of the fit curve is:

$$f(x) = y = A * e^{-\frac{|x-\mu|^n}{v}}$$

where y is the sampled trace as a function of x which corresponds to the sampling time (or equivalently to the sampling distance) and n is a predetermined value that is different depending on whether (x−μ) is positive or negative. The absolute value of (x−μ) is used since the exponent is not an even integer. The curve f(x) is fitted over the sampled trace to find the values of the parameters A, μ and v. The final result that is of interest is the value of μ which gives the position of the peak.

Note that as opposed to a Gaussian function, since n is different depending on the sign of the numerator, v is not affected by it. Experience has shown that this function gives a better fit to the signal. Even though the exponent is different for positive and negative values of (x−μ), all other parameters are the same in order to insure continuity at the peak.

In order to find the values of the parameters A, μ and v, the combined trace is plugged in the equation f(x) and a minimization algorithm is used. Since a good starting point which is close to the solution is known, any known minimization algorithm can be used. In one embodiment, the following starting point is used: A=the highest value of y, μ=the x position of the highest value and v=5.8. This last value should be adjusted in function of specific characteristics of the device 10. If the sampling rate is higher and more points are available, one can also use the exponents n as variable parameters. In the case shown in FIG. 8c, n is fixed to 2.3 for the negative side and to 1.5 for the positive side. Of course these values should be adjusted to the specific characteristics of the device 10.

It is noted that the derivatives of the equation, for use in the minimization algorithm, are:

$$\frac{df}{dA} = e^{-\frac{|x-\mu|^n}{v}} = 0$$

$$\frac{df}{d\mu} = s * A * e^{-\frac{|x-\mu|^n}{v}} * n * \frac{|x-\mu|^{n-1}}{v} = 0$$

$$\frac{df}{dv} = \frac{|x-\mu|^n * A * e^{-\frac{|x-\mu|^n}{v}}}{v^2} = 0$$

Note that the following error function is typically used in the minimization algorithm:

$$E = y_i - f(x_i).$$

The number of points used and the number of variable parameters will of course strongly depend on the processing power and time available as minimization is a compute intensive operation.

FIG. 8a shows a curve fit obtained with a trace resulting from an accumulation of 2 and shows how difficult is the curve fitting with a noisy signal. FIG. 8b shows an improvement in terms of SNR by accumulation of 8. Finally, FIG. 8c shows an example of how an accumulation of 1024 results in a good curve fitting. A good accuracy of the fill-level measurement is consequently possible even when using a LED as the light source 21. This method has some limitations particularly if the mathematical model need to be modified due to a change in the hardware parameters (type of LEDs, pulsing and sampling technology) and does not work perfectly when the signal is weak and noisy (the fit performance degrades and it is also difficult to find the candidate points without having false detections).

A natural extension of this method is to record a sample pulse using a strong signal and a very low level of noise (using a high number of accumulations). This becomes our reference or "ideal" signal. We can then fit this signal on "normal" pulses and use the peak of the reference as the distance. However to work well, this method requires a higher resolution so that the number of points on the pulse is higher, giving better redundancy in the fit algorithm to compensate for noise. This method gives good results, however robustly fitting a set of points to another set of points requires complex algorithms and significant computing power which is not always available in low-cost, small size industrial systems. Also this method does not solve the problem of finding proper candidates in a weak and noisy signal.

If we can increase the resolution of the trace, then the points are much closer to the peak and the parabolic approximation is much better. However because of the noise, the trace around the peak may not be smooth and so the highest point may not be the closest to the "real" peak. Our third method then consists of filtering the trace to make it smooth around the peak. This also has the very important advantage of making it much easier to find weak pulses without triggering on noise.

The best way to smooth a curve (i.e. removing high frequency noise) when you know the shape of the signal you are looking for is to correlate the recorded signal with an "ideal" one (the same we used in the previous method). This significantly reduces the high frequency noise and makes the trace much smoother (at the expense of a flattening and widening of pulses). This also requires much simpler algorithms that are easily optimized on most modern processors.

However if the trace is noisy, a good resolution is needed for the filtering to be effective. Also with a lower resolution and more accumulations to reduce noise it is possible to get a good repeatability (low standard deviation on the distance value) but again the fact that the pulse is not parabolic may make the computed distance not monotonically related to the real distance if the resolution is too low (however if the repeatability is good it is always possible to create a calibration that corrects the error between computed and real distance). The higher the resolution the close the peak is to the parabolic approximation.

If after filtering the level of noise on the computed distance is still too high and the distance is changing only slowly, it is also possible to perform a moving average on the traces. In order to react as fast as possible to real distance changes, it is possible to reset the average when a significant changes is detected between the last averaged trace and the new raw trace. To be able to differentiate real changes from noise, it is much better to perform the moving average on the filtered traces. Performing the averaging directly on the traces instead of on the measured distance has the advantage of a significant reduction of noise without inducing a delay between a real distance change and the measured distance. Also, compared to increasing the number of accumulations, it does not increase the time needed to get one measurement.

Figure 11:
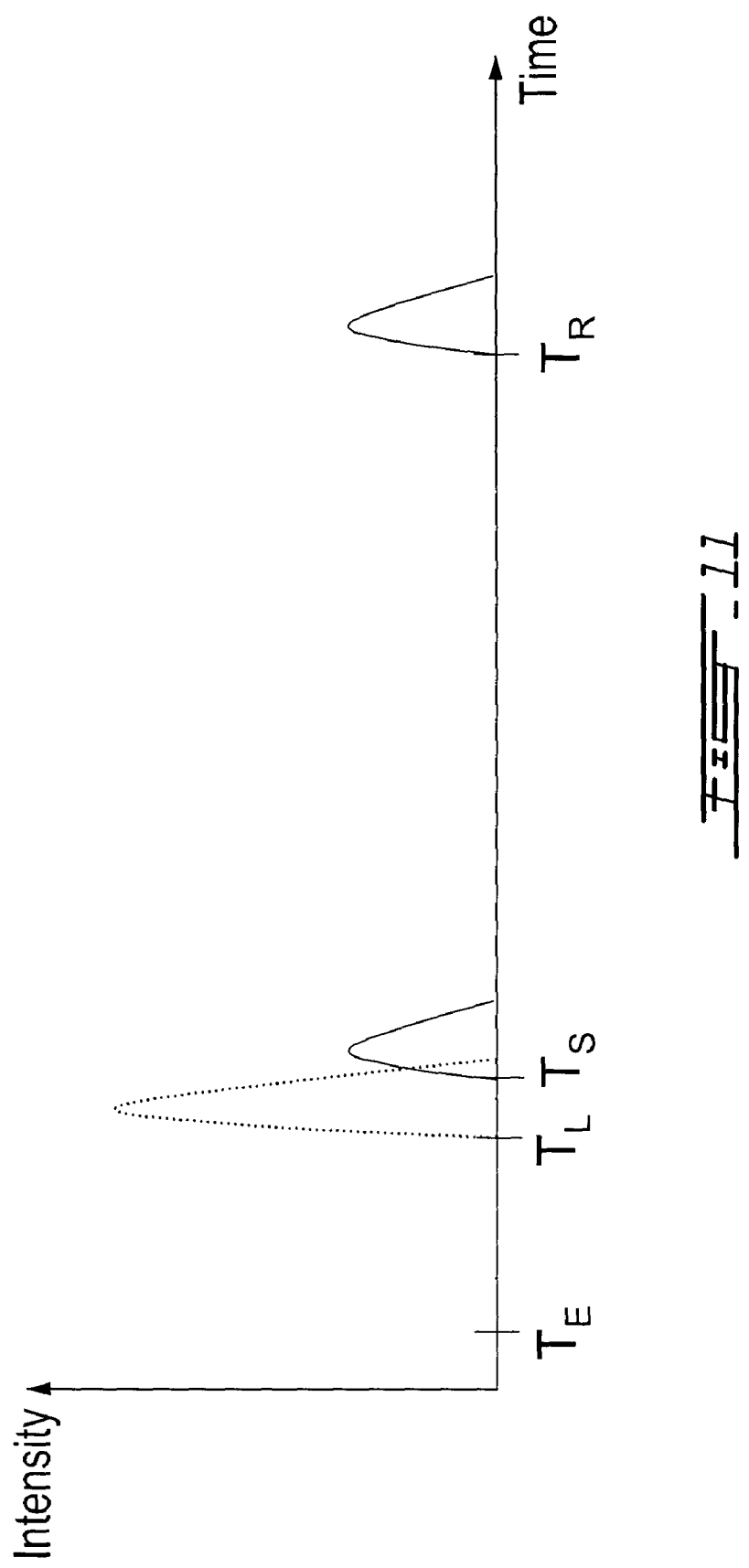
FIG. 11 is a graph illustrating the time referencing of a light pulse signal.

Now referring to FIG. 11, optical synchronisation using a reference light pulse is described. When a triggering signal starts the pulse driver 22 at time $T_E$, a delay occurs between the electrical signal and light pulse. The emitted light pulse starts at $T_L$. This delay depends mainly on the pulse driver's components, print circuit board and the optical source. This delay is not constant and may vary notably in function of temperature. In order to compensate for the variation of the delay between pulse driver 22 and the light pulse ($T_L-T_E$), a reference light pulse is produced and detected. The reference light pulse can be produced by coupling the light source 21 to a second optical detector using a fibre optic, or using the refection of the light source 21 on lens 26. In order to avoid overlapping between the reference pulse and the light pulse signal reflected on the surface of the container 11, the second optical detector is separate from the optical detector 29. The reference light pulse starting at time $T_S$ is detected and sampled using the same techniques as those applied to the reflected light pulse signal. A reference trace is thus provided and used to reference the signal trace corresponding to the reflected light pulse signal. The difference between $T_L$ and $T_S$ is related to the optical path distance between the lens 26 and the second optical detector (or to the length of the fibre optic if one is used). The reflected light pulse signal on the signal trace starts at $T_R$ but the fill-level is actually related to $T_R-T_L$ and not to $T_R-T_E$. The synchronisation of the signal trace is referenced by determining the delay ($T_L-T_E$) using the reference trace. The fill-level in the container 11 is then determined using the referenced signal trace.

It is noted that the signal fitting, accumulation and phase shift techniques are typically combined and used in the same way for acquisition of the reference trace and the signal trace.

Perturbations on the surface of liquid increase the difficulty of measuring the distance to the surface particularly when using a laser with a collimated beam. The diameter of the spot of the Laser beam can be less than one cm (collimated into few milliradians) and the amplitude of the reflection on the surface of the liquid varies in function of the portion of wave on the surface and may be inadequate when the small spot hit an inclined portion of a surface with disturbance. The use of a diffuser to increase the spot size to overcome this problem is a potential solution disclosed in U.S. Pat. No. 5,648,844. This patent also disclosed the theoretical possibility of using LEDs but doesn't recommend this approach due to limited accuracy, high noise and slower response of this type of optical sources. Those limitations have been overcome by the sensitivity and the accuracy of our method. We can use different optics for LEDs with different beam angles.

FIG. 12 shows a flowchart illustrating a process for determining a level of a substance in a container. The flowchart of FIG. 12 summarizes the complete process of optical level sensing. In this flowchart, some steps may be optional and are identified by using a dashed box for the step. At system start-up 500, default parameters (as listed in 500) are set to achieve high sensitivity so that if the container is empty, detection of the echo back from the container bottom will be possible. A continuous loop is then started.

At 502, the digital Lidar trace is acquired (as previously explained). This raw trace is then digitally filtered at 504. There are 2 levels of filtering applied: The first level is a correlation with an ideal normalized pulse. This removes high frequency noise making the trace much smoother, significantly increasing the signal-to-noise ratio and improving the reliability of pulse detection (especially for weak pulses). The second level is a moving average on the whole smooth trace to filter low frequency variations from trace to trace. This increases the repeatability of the measured distance.

At 506 pulses are detected. A pulse is defined as a local maximum with) sufficient amplitude (difference between highest and lowest point) and width (distance between start of rise and end of descent) to be sure that it is really an echo and not random noise. The minimum amplitude is computed from the noise level and the target width is derived from the ideal pulse. If noise level is high, even after filtering the trace may not be perfectly smooth so this detection is robust to low amplitude glitches.

Once potential pulses are found, there is performed at 508 a fit of the ideal pulse on all the candidates to find the best one (in the context of level-sensing, we do not want more than one distance). The best one will be the one with the smallest difference (or error) to the ideal pulse. This fit is performed on normalized data, independent of the amplitude.

At 510, there is extracted a distance from the results of the best fit. This distance is a complementary result from the fit derived from where the ideal pulse was fitted on the acquired trace. This distance is then sent to the outside world at 512.

Then come two options of post-processing. The need for these steps depends on the level of variability of conditions in the container. They can be omitted if conditions are very stable and the initial parameters are always adequate. At 514, there is computed a signal-to-noise ratio and also to verify if some pulses reach the maximum signal value (saturation). The noise level is provided by the acquisition hardware, and the signal is the amplitude of the best pulse (as chosen in 508). At 516, the information computed in previously is used to adjust acquisition parameters before performing the next acquisition. For example if saturation is detected, the intensity of the light pulse and/or the sensitivity of the detector can be lowered. If the signal-to-noise ratio is too low, the number of accumulations and/or the intensity of the light pulse can be increased.

The loop is then closed by returning to 502.

The embodiments described above are intended to be exemplary only. The scope of the invention is therefore intended to be limited solely by the appended claims.

While illustrated in the block diagrams as groups of discrete components communicating with each other via distinct data signal connections, it will be understood by those skilled in the art that the illustrated embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the described embodiment.

What is claimed is:

1. A method for determining a level of a substance in a container, the method comprising:

emitting one pulse from a light source in a field of illumination toward a surface of said substance in said container;

detecting a backscatter signal of said pulse by an optical detector;

creating a lidar trace from said backscatter signal, said lidar trace including at least one reflection peak;

identifying a surface reflection among said at least one reflection peak in said lidar trace, said surface reflection being a reflection of said pulse from said surface;

signal-fitting said surface reflection to provide a fitted surface trace; and determining a level of said substance in said container using said fitted surface trace.

2. The method as claimed in claim 1, wherein said identifying said surface reflection comprises signal-fitting each of said at least one reflection peak and determining a best matched reflection peak to be said surface reflection.

3. The method as claimed in claim 1, wherein said identifying said surface reflection comprises identifying a last one of said at least one reflection peak to be said surface reflection.

4. The method as claimed in claim 1, wherein said substance is a transparent liquid and wherein said identifying said surface reflection comprises eliminating a container bottom reflection from said at least one reflection peak using a known shape for a reflection from a bottom of said container.

5. The method as claimed in claim 1, further comprising:
detecting a reference backscatter signal of said pulse by a reference optical detector at said emission of said pulse thereby acquiring a reference zero value and a reference trace for said pulse;
comparing said reference trace for said pulse to said combined trace; and
determining a distance traveled by said pulse based on said comparison.

6. The method as claimed in claim 1, wherein said signal-fitting comprises curve-fitting a non-symmetrical quasi-Gaussian function on said trace.

7. The method as claimed in claim 6, wherein said curve-fitting uses the point corresponding to the peak of the curve as the reference position, wherein the curve is quasi-Gaussian in that the exponent is not 2, the equation being:

$$f(x) = y = A * e^{-\frac{|x-\mu|^n}{v}},$$

where y is the sampled trace as a function of x which corresponds to the sampling time and n is a predetermined value that is different depending on whether $(x-\mu)$ is positive or negative.

8. The method as claimed in claim 7, wherein finding the values of the parameters A, $\mu$ and v, comprises plugging the combined trace in the equation f(x) and a minimization algorithm is used with the following equations:

$$\frac{df}{dA} = e^{-\frac{|x-\mu|^n}{v}} = 0$$

$$\frac{df}{d\mu} = s * A * e^{-\frac{|x-\mu|^n}{v}} * n * \frac{|x-\mu|^{n-1}}{v} = 0$$

$$\frac{df}{dv} = \frac{|x-\mu|^n * A * e^{-\frac{|x-\mu|^n}{v}}}{v^2} = 0.$$

9. The method as claimed in claim 8, wherein finding the value comprises using the following starting point: A=the highest value of y, $\mu$=the x position of the highest value and v=5.8.

10. The method as claimed in claim 1, wherein said detecting further comprises
using at least one other optical detector for detecting at least one other backscatter signal of said pulse; and
multiplexing said backscatter signal with said at least one other backscatter signal.

11. The method as claimed in claim 1, wherein said determining the level comprises determining the level of one of a liquid, a paste and a solid.

12. The method as claimed in claim 1, further comprising controlling said light source by a pulse driver to modify an output power of said light source.

13. The method as claimed in claim 12, further comprising providing a detection parameter and wherein said controlling uses said detection parameter.

14. The method as claimed in claim 13, wherein said providing said detection parameter comprises providing a reflectivity parameter, said reflectivity parameter being indicative of a reflectivity of at least one of said substance and walls of said container.

15. The method as claimed in claim 13, wherein said providing said detection parameter comprises providing a range parameter, said range parameter being indicative of a level of said substance in said container.

16. The method as claimed in claim 13, wherein said providing said detection parameter comprises providing a clarity parameter, said clarity parameter being indicative of a dust density inside the container.

17. A fill-level sensing device for determining a level of a substance in a container comprising:
a light source for emitting light in a field of illumination toward a surface of said substance in said container;
a pulse driver for driving the light source into emitting one pulse;
an optical detector adapted to detect a backscatter signal of said pulse; and
a data/signal processor for creating a lidar trace from said backscatter signal, said lidar trace including at least one reflection peak, for identifying a surface reflection among said at least one reflection peak in said lidar trace, said surface reflection being a reflection of said pulse from said surface; for signal-fitting said surface reflection to provide a fitted surface trace; and for determining a level of said substance in said container using said fitted surface trace.

18. The fill-level sensing device according to claim 17, wherein the light source is one of a light-emitting diode (LED) and a laser.

19. The fill-level sensing device according to claim 17, further comprising a timer, the timer being triggered by the data/signal processor to calculate a time elapsed between said emission of said pulse and said detection of said backscatter signal, the data/signal processor determining a distance traveled by said pulse based on said time elapsed.

20. The fill-level sensing device according to claim 17, further comprising an analog-to-digital converter for sampling the backscatter signal of said pulse, and a pre-processing and synchronisation unit for controlling parameters of said pulse from the analog-to-digital converter.

21. The fill-level sensing device according to claim 20, wherein the parameters are at least one of the optical power of the light pulse, the number of pulses used for pre-process operation, a gain of amplifier, a synchronization between the pulse driver and the analog-to-digital converter, and a sample rate of analog-to-digital converter.

* * * * *